Feb. 11, 1958  L. L. SIMMONS  2,822,674
AIR CONDITIONING UNIT
Filed May 5, 1955  3 Sheets-Sheet 1
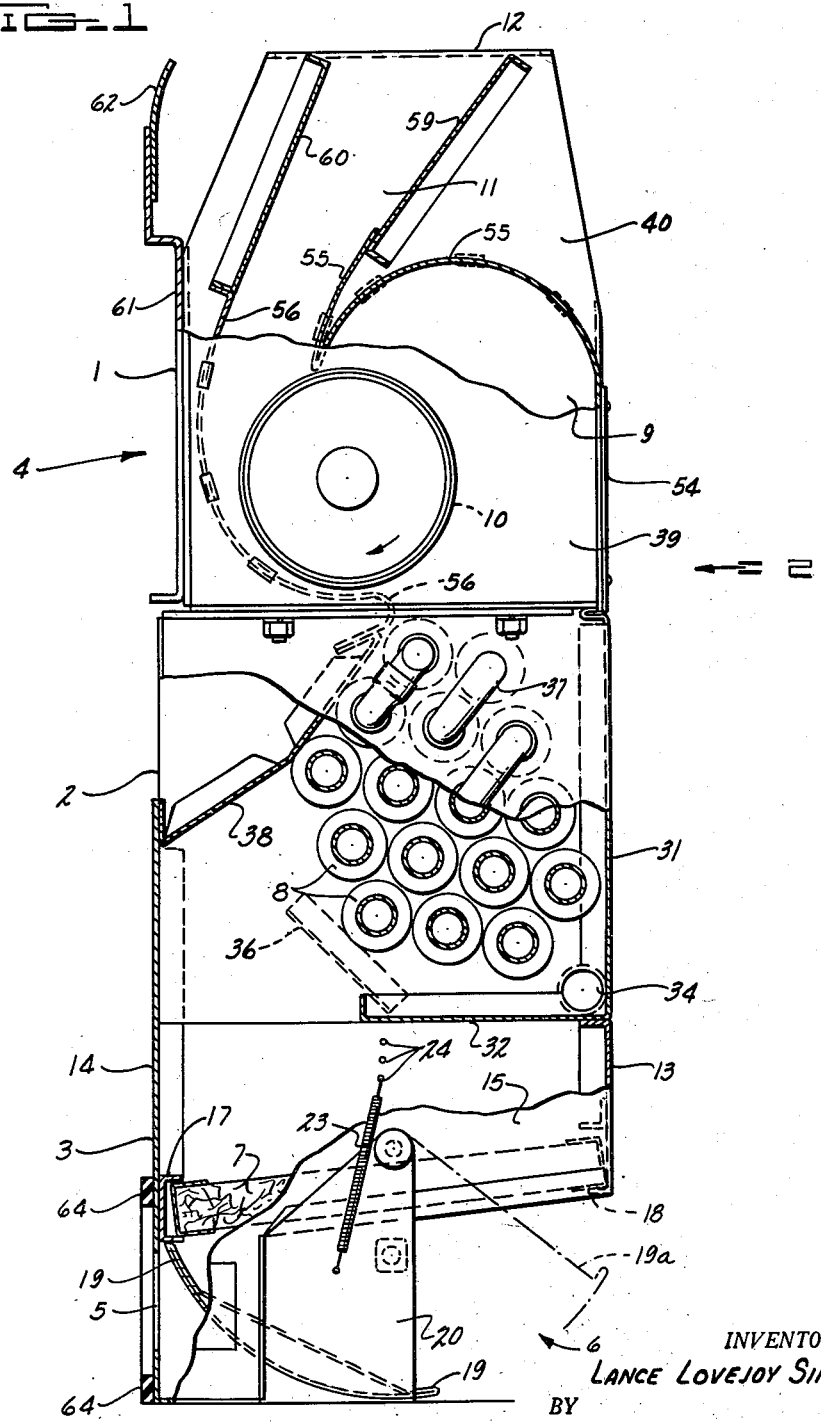
INVENTOR.
LANCE LOVEJOY SIMMONS
BY
SMITH, OLSEN & KOTTS
ATTORNEYS Feb. 11, 1958  L. L. SIMMONS  2,822,674
AIR CONDITIONING UNIT
Filed May 5, 1955  3 Sheets-Sheet 2
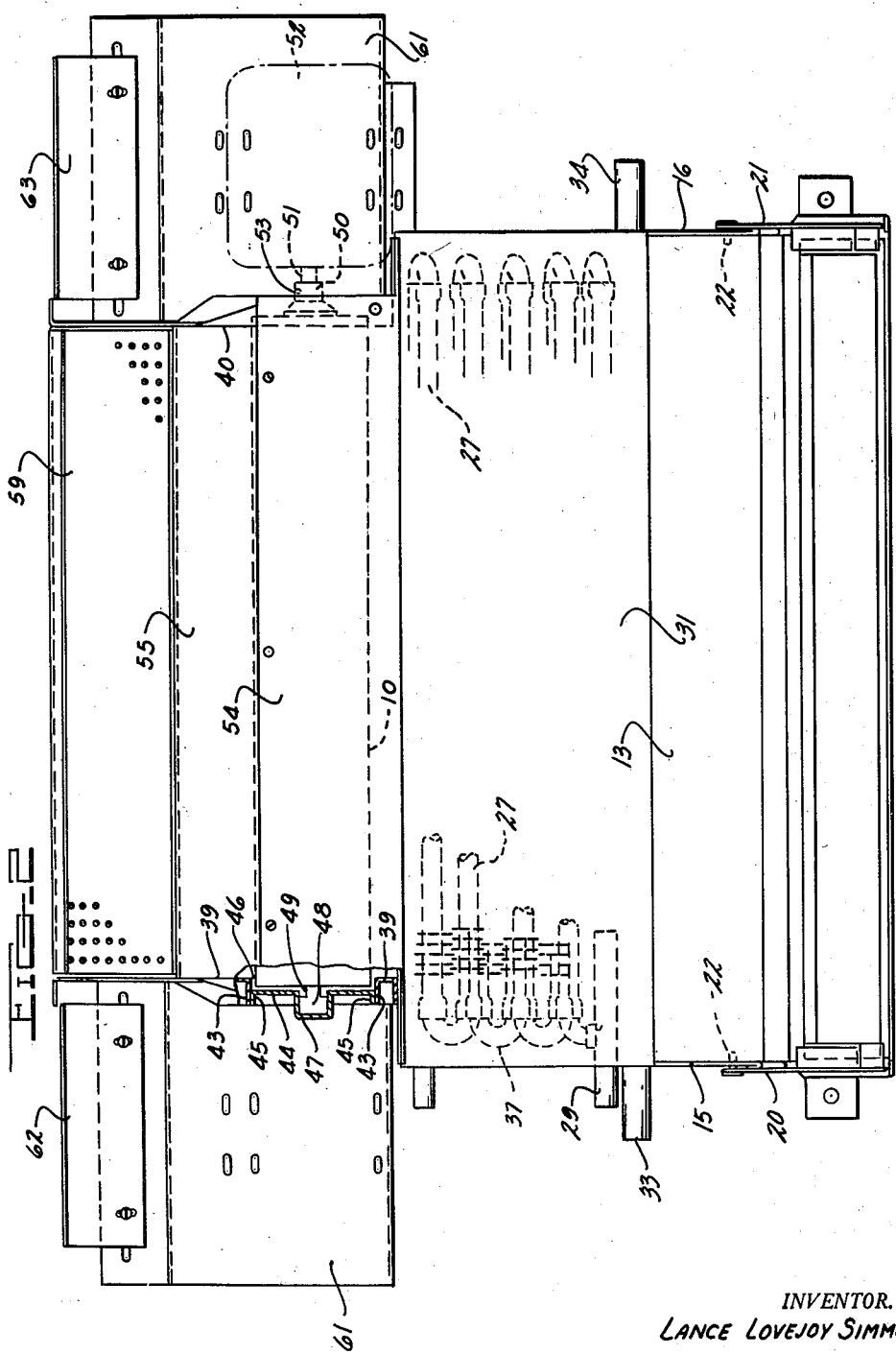
INVENTOR.
LANCE LOVEJOY SIMMONS
BY
SMITH, OLSEN & KOTTS
ATTORNEYS

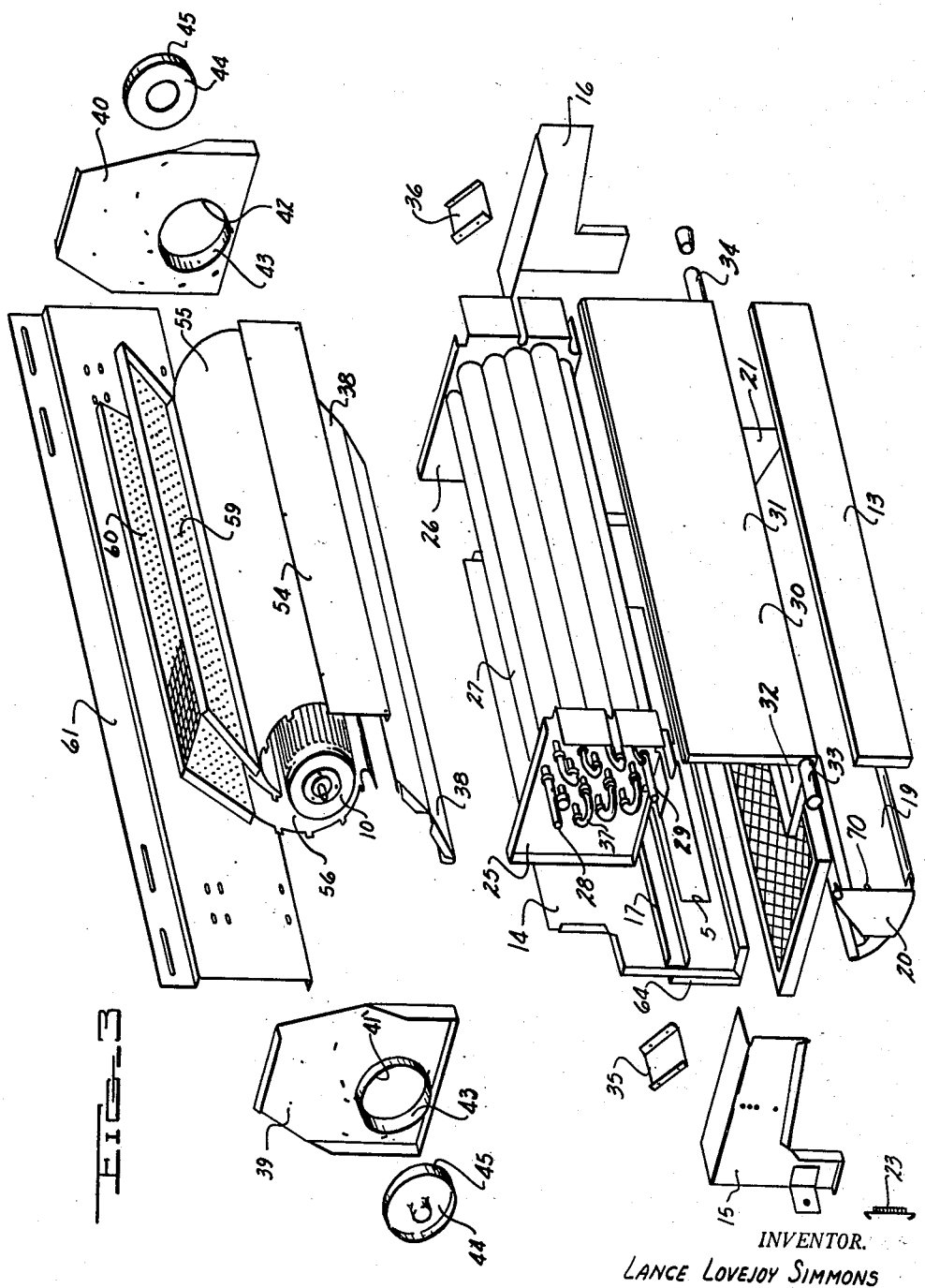

United States Patent Office 2,822,674
Patented Feb. 11, 1958

2,822,674

AIR CONDITIONING UNIT

Lance Lovejoy Simmons, Detroit, Mich., assignor, by mesne assignments, to American Radiator & Standard Sanitary Corporation, New York, N. Y., a corporation of Delaware Application May 5, 1955, Serial No. 506,271

8 Claims. (Cl. 62—140)

This invention relates to an air conditioner unit, and particularly to a core assembly for such a unit.

The core assembly preferably includes a blower, a heat exchange unit, a drip pan for collecting condensate from the heat exchange unit, and an air filter. The assembly is of such design as to permit its being employed in a vertically disposed conditioner or in a horizontally disposed conditioner.

The vertically disposed conditioner discharges its air in a vertical direction, and the horizontally disposed conditioner discharges its air in a horizontal direction. Different installations require different dispositions of the conditioner (either vertically disposed or horizontally disposed) and different directions of air discharge (in vertical directions or horizontal directions). Multiple employment of the core assembly (as an assembly for a vertically disposed conditioner or a horizontally disposed conditioner) is advantageous in that it permits lowered parts inventories and lowered production costs without sacrificing desired flexibility in conditioner design.

Employment of the core assembly in both vertically and horizontally disposed conditioners is made possible by reason of the drip pan design. The drip pan is so constructed that portions thereof extend beneath the heat exchange unit whether the core assembly is utilized in a horizontally disposed conditioner or in a vertically disposed conditioner.

As stated previously the core assembly includes a blower. The blower preferably comprises a cylindrical line flow fan operating in a scroll-shaped fan casing. Operation of the fan is such that air is taken in at one area on the fan periphery, moved through the fan interior, and discharged at another area on the fan periphery. In order to increase the air-moving efficiency of the blower, the fan casing is provided with a pair of end plates having cylindrical recesses therein of slightly larger diameter, than the fan rotor. These recesses are believed to reduce air turbulence adjacent the fan ends and this reduction in air turbulence is believed responsible for the increase in air moving efficiency of the blower.

Preferably the recesses are formed partly by separate cover plates which are removably secured on the end plates. By removing these cover plates access may be had to the fan and its bearings without disassembling the core assembly. This access facilitates installation, removal, and/or repair of the fan and its bearings.

One object of the invention is to provide for lowered parts inventories and lowered production costs in the construction of air conditioner units.

Another object is to provide for lowered production costs without unduly limiting the types of air conditioners being produced.

As an aid in lowering production costs, it is another object to provide in an air conditioner a core assembly including a heat exchange unit and drip pan, wherein said assembly can be utilized in vertically disposed conditioners and horizontally disposed conditioners.

Another object is to provide in an air conditioner a core assembly including a blower, wherein said blower will have an increased air-moving efficiency.

Another object is to provide a blower wherein air turbulence is reduced.

Another object is to provide in a blower a line flow fan and baffle means for reducing air turbulence adjacent the ends of the fan.

Another object is to provide a fan casing of such construction as to permit easy installation of the fan and its bearings, and easy removal of the fan and its bearings for repair and/or replacement.

Other objects of this invention will appear in the following description and appended claims, reference being had to the accompanying drawings forming a part of this specification wherein like reference characters designate corresponding parts in the several views.

In the drawings:

Figure 1 is an end view of one embodiment of the invention as it appears when utilized within a "vertically disposed" conditioner casing (not shown), Figure 2 is a view taken along arrow 2 in Figure 1, and Figure 3 is an exploded view of the component parts of the embodiment shown in Figures 1 and 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there are shown a core assembly 4 comprised of a blower assembly 1, a heat exchanger and drip pan assembly 2, and a filter box and damper assembly 3. The blower assembly is of such design and construction as to draw air into the core assembly through the fresh air inlet 5 or recirculated air inlet 6 (depending on the position of the damper in assembly 3). The drawn in air passes upwardly through filter element 7, between heat exchanger coils 8, into passage 9, through cylindrical fan 10, into passage 11 and out through outlet 12.

The filter box and damper assembly 3 includes a front panel 13, a back panel 14 and two end panels 15 and 16. A channel 17 is secured on panel 14 for supporting the rear end of filter element 7, and the lower edge of panel 13 is turned rearwardly at 18 to provide a supporting surface for the front end of element 7. A damper is provided at 19 and includes two wing members 20 and 21 having pins 22 extended therethrough into end panels 15 and 16, whereby to mount the damper for pivotal movement from its full line position (Figure 1) to its dotted line position 19a, and vice versa. An over center tension spring 23 is provided for releasably retaining damper 19 in its full line position or dotted line position. In the full line position damper 19 admits recirculation air to the conditioner through inlet 6. In its dotted line position, the damper admits fresh air to the conditioner through inlet 5. A stop pin is provided at 70 for limiting movement of the damper to its dotted line position. A plurality of apertures 24 are provided in plate 15 for adjusting the position of spring 23, as when it weakens after extended periods of use. Inlet 5 in practice communicates with a fresh air source outside the building or room being conditioned, and inlet 6 communicates with the interior of the building or room being conditioned.

Heat exchanger and drip pan assembly 2 includes a pair of tube sheets 25 and 26, and a plurality of finned heat exchanger tubes 27. A supply connection for the tubes is provided at 28 and a return connecction is provided at 29. Extending across two sides of the heat exchanger defined by tubes 27 and tube sheets 25, 26 is a drip pan 30 provided by a front wall 31 and a right angularly disposed wall 32. Each of walls 31 and 32 is provided with flanges on three of its edges whereby to form the completed pan. Drain pipes are provided at 33 and 34 for removing condensate from the drip pan. Two plates 35 and 36 are disposed in downwardly inclined relations on the outer faces of tube sheets 25 and 26, whereby when core assembly 4 is in its Figure 1 position any condensate from reverse bend couplings 37 will be directed into the drip pan. Core assembly 4 is susceptible of being disposed in either the "vertical" position shown in Figure 1 in which wall 32 receives condensate from the air passing around tubes 27 or a "horizontal" position (not shown) in which wall 31 receives condensate from the air passing around tubes 27.

In order to direct air over tubes 8, there is provided in the space between tube sheets 25, 26 a baffle plate 38. Secured on the upper edges of sheets 25 and 26 are two plates 39 and 40 having formed therein two circular openings 41 and 42 bounded by outwardly turned flanges 43. A plate 44 is received within each of openings 41 and 42 and includes an outwardly turned flange 45 for its removable mounting within flange 43 by screw means (not shown). Each of plates 44 is offset relative to respective ones of plates 39 and 40 whereby to cooperate with flanges 43 in the formation of a plate means having cylindrical recesses 46 therein. These recesses accommodate and overlie the ends of fan rotor 10 (which is preferably constructed as disclosed in co-pending application, Serial No. 503,167, filed on April 22, 1955). The central portion of left-hand plate 44 is offset outwardly to form a cup 47 for receiving the bearing assembly 48 of rotor shaft 49. The right end of the rotor has secured thereto a flexible coupling element 50 whereby to fixedly but removably secure the rotor on the shaft 51 of a fan-driving motor 52. A set screw 53 effects the securement. Removal of fan rotor 10 and/or its bearings from the Figure 2 position may be effected by removing left-hand plate 44, unloosening set screw 53, and withdrawing rotor 10 axially through opening 41.

Fan rotor 10 operates in a scroll-shaped casing formed in part by a front plate 54, an arcuate plate 55 extending from the upper edge of plate 54, and another arcuate plate 56 extending from the aforementioned plate 38. Two apertured sound-absorbing panels 59 and 60 extend from the downstream edges of plates 55 and 56 to complete the scroll-shaped casing.

Operation of motor 52 is such that fan rotor 10 is turned in a clockwise direction (see Figure 1), whereby to draw air through filter element 7, over tubes 8, through scroll-shaped chamber 9, 11 and out through outlet 12. As stated previously, the ends of rotor 10 are received within recesses 46. These recesses are believed to increase the air-moving efficiency of the fan by decreasing air turbulence adjacent the fan rotor ends. The anti-turbulent action is believed to obtain from the fact that all of the air issuing from the rotor blades is moving at the same velocity. If the lateral edges of rotor 10 were spaced inwardly from plates 39 and 40 (as would occur if recesses 46 were not present) the air in said spaces would be moving at lower velocities than the air in line with the rotor blades. This velocity difference would cause some of the faster moving air to move into the area of lower velocity and would result in an undesired turbulence. Such turbulence would reduce the air-moving efficiency of the fan. With the instant construction the spaces between the fan rotor ends and plates 44, 44 are outside the air stream so as to avoid the aforementioned turbulence. Any turbulence is confined to the spaces within recesses 46 and does not interfere with the flow of air in the space between plates 39 and 40.

In order to mount motor 52 there is provided a plate 61. Bracket means (not shown) secures the motor in place on plate 61. For certain installations it is desirable that motor 52 be mounted at the left end of the fan rotor. Plate 61 is therefore extended beyond the left face of plate 39 and openings are provided adjacent both ends of plate 61 to accommodate securement means for the motor bracket means.

It will be understood that in practice a casing (not shown) will surround core assembly 4, the character of said casing to be determined by whether the conditioner is to be a "vertically" disposed unit or a "horizontally" disposed unit. For mounting the core assembly within the casing and preventing sound emission therefrom, there are provided a pair of brackets 62, 63 and a rubber pad 64.

I claim:

1. A blower comprising a casing having an air inlet and an air outlet, a centrifugal fan between said inlet and outlet with its axis of rotation parallel to the plane of the inlet and the plane of the outlet, and plate means closing the ends of the fan casing, said plate means having cylindrical recesses therein for receiving the ends of the fan to reduce air turbulence adjacent the fan ends.

2. A blower comprising a casing having an air inlet and an air outlet, a cylindrical fan between said inlet and outlet with its axis of rotation parallel to the plane of the inlet and the plane of the outlet, and plate means closing the ends of the fan casing, said plate means including a pair of parallel plates having openings in registry with the fan axis and recess-forming means secured in said openings for enclosing the ends of the fan, whereby to reduce air turbulence adjacent the fan ends.

3. A blower comprising a casing having an air inlet and an air outlet, a cylindrical fan between said inlet and outlet with its axis of rotation parallel to the plane of the inlet and the plane of the outlet, and plate means closing the ends of the fan casing, said plate means including a pair of parallel plates having openings in registry with the fan axis and recess-forming means releasably secured in said openings for enclosing the ends of the fan whereby to reduce air turbulence adjacent the fan ends, the releasable securement of the recess-forming means serving to permit installation and removal of the fan through one of said openings.

4. An assembly for an air conditioner comprising a heat exchange unit, a drip pan and a blower, said heat exchange unit including a plurality of tubes and two parallel tube sheets having two angularly disposed edge portions, said drip pan including two angularly disposed wall portions extending across the angularly disposed edge portions of the tube sheets, said blower including a pair of end plates in alignment with the tube sheets, walls extending between said end plates to define an air inlet and an air outlet for the blower, and a fan rotor between said inlet and outlet for moving air through said heat exchange unit and blower.

5. An assembly for an air conditioner comprising a heat exchange unit, a drip pan enveloping two sides of said heat exchange unit, and a blower for moving air through said heat exchange unit, said blower including a casing having an air inlet and an air outlet, a fan rotor between said inlet and outlet, and plate means closing the ends of the fan casing, said plate means having cylindrical recesses therein for receiving the ends of the rotor whereby to reduce air turbulence adjacent the rotor ends.

6. An assembly for an air conditioner comprising a heat exchange unit and a blower, said heat exchange unit including a plurality of tubes and two parallel tube sheets, said blower including a pair of end plates in alignment with the tube sheets and having cylindrical recesses therein, walls extending between said end plates to define an air inlet and an air outlet for the blower, and a fan rotor between said inlet and outlet for moving air through the heat exchange unit and blower, the ends of the rotor being received in the cylindrical recesses.

7. An assembly for an air conditioner comprising a heat exchange unit, a drip pan and a blower, said heat exchange unit including a plurality of tubes and two parallel tube sheets having two angularly disposed edge portions, said drip pan including two angularly disposed wall portions extending across the angularly disposed edge portions of the tube sheets, said blower including a pair of end plates in alignment with the tube sheets and having cylindrical recesses therein, walls extending between said end plates to define an air inlet and an air outlet for the blower, and a fan rotor between said inlet and outlet for moving air through the heat exchange unit and blower, the ends of the rotor being received in the cylindrical recesses.

8. An assembly for an air conditioner comprising a heat exchange unit, a drip pan and a blower; said heat exchange unit including two parallel tube sheets having two right angularly disposed edge portions, a plurality of heat exchange tubes extended between said tube sheets, and passage-forming wall means extending between said tube sheets and at an acute angle to both of the aforementioned edge portions; said drip pan including two right angularly disposed wall portions extending between the tube sheets along the aforementioned edge portions to cooperate with the aforementioned wall means in the directing of air over the heat exchange tubes, one of said drip pan wall portions terminating short of the passage-forming wall means to define therewith an air inlet; said blower including a pair of end plates in alignment with the tube sheets, curved walls extending between said end plates from said passage-forming wall means and the other of said drip pan wall portions to define a scroll-shaped fan housig, and a cylindrical fan rotor within said fan housing, said rotor having an axis of rotation at right angles to the end plates.

References Cited in the file of this patent
UNITED STATES PATENTS

| | | |
|---|---|---|
| 1,705,200 | Morse | Mar. 12, 1929 |
| 1,950,768 | Anderson | Mar. 13, 1934 |
| 2,434,847 | Hagen | Jan. 20, 1948 |
| 2,580,535 | Feinberg | Jan. 1, 1952 |
| 2,697,921 | Brugler | Dec. 28, 1954 |